Figure 1:
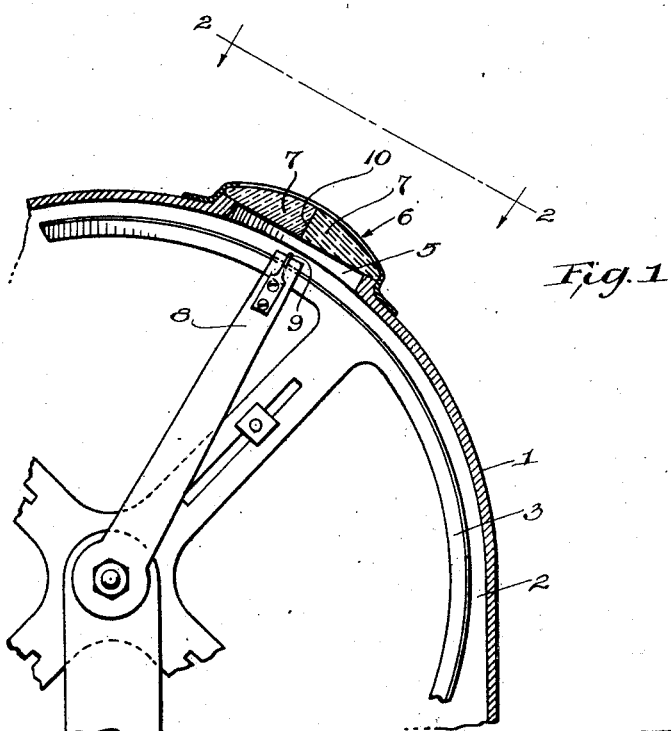

Jan. 19, 1932.   N. A. HALLWOOD   1,841,948

SCALE

Filed Dec. 20, 1928

Inventor
N. A. Hallwood

By W. S. McDowell
Attorney

Patented Jan. 19, 1932

1,841,948

UNITED STATES PATENT OFFICE

NATHAN A. HALLWOOD, OF COLUMBUS, OHIO

SCALE

Application filed December 20, 1928. Serial No. 327,382.

This invention relates, generally considered, to an improved lens structure adapted to be employed in connection with movable graduated instrumentalities by which an operative is enabled to obtain accurate readings of said instrumentalities with facility and convenience. In regard to its more specific aspects the invention is useful in connection with computing scales of the type which employ rotatable drums movable through various distances in response to the weight or load received by the scale, the said lens structure being mounted in connection with the casing or other stationary part of the scale so that the value or computing indicia provided on the peripheral surface of the drum may be clearly viewed by the scale operator through the lens structure and a proper reading obtained by the values represented by the positions of the drum.

Many computing scales now in commercial use include weight indicating mechanisms which embody a rotatable drum mounted within a closed casing and having weight and price graduations provided upon the outer circumferential wall thereof, the casing being provided with a sight or reading opening covered ordinarily with a lens across which extends a fine wire which constitutes a longitudinally extending element by which the operator of the scale is enabled to read quite accurately the indicia appearing on the drum. Practice has disclosed that this customary construction results frequently in erroneous readings of the scale indicating means, since unless the operator or reader is standing in the horizontal plane of the wire or longitudinal indicator a true and accurate comparison on the wire or line with the graduations on the drum can not be obtained. For example, a person of short stature looking upwardly at an angle into the reading lens will obtain a different view of the indicating mechanism than a person of tall stature looking downwardly into the lens.

Therefore, in order to obviate this condition and to compel the reader to assume a correct position in reading the scale, the present invention provides a lens structure consisting of a pair of longitudinally extending sections provided with round abutting surfaces. When these surfaces are viewed in edge elevation they present merely a fine line to the sight of the operator which registers with a longitudinally extending reading wire placed immediately to the rear thereof, the reading wire and the ground surfaces of the lens sections offer little or no obstruction when properly viewed to the reading of the drum surface and in fact permit the very minute graduations on the drum surface to be readily compared with the longitudinally extending reading elements. However, when the scale is read from an improper angle either to one side or the other of the meeting surfaces of the lens, said meeting surfaces present an opaque body of appreciable width, which obscure the surface of the drum and prevent an attempted reading thereof with any degree of accuracy, compelling the reader thereby to assume a correct position so as to bring the reading elements into true edge elevation, in which position correct readings are obtainable in a very simple manner. This invention constitutes a continuation in part of my patent of September 24, 1929, No. 1,729,106, for improvements in weight indicating mechanism for scales, filed February 27, 1928.

With these and other objects in view which will appear as the description proceeds, the invention consists in the novel features of construction, combinations of elements and arrangements of parts hereinafter to be fully described and pointed out in the appended claims.

Figure 2:
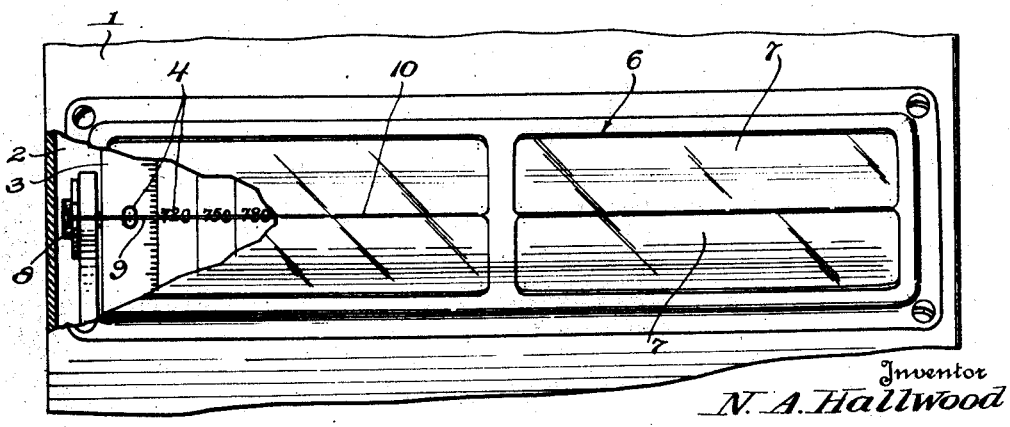

In the accompanying drawings:

Figure 1 is a vertical sectional view taken transversely through the weight indicating means of a weighing scale and discloses more particularly the lens structure, comprising the present invention, mounted therein, and Figure 2 is a view in front elevation of the scale casing showing the improved lens structure, viewed as indicated by the arrows of line 2—2 in Figure 1, parts being broken away to show underlying structure.

Referring more particularly to the drawings the numeral 1 designates the casing of a weighing scale of the type disclosed, for example, in my aforesaid "pending application" Serial No. 283,620. The casing is formed to provide a drum chamber 2, in which is rotatably mounted a weight indicating and value computing drum 3. This drum, as usual, is of light weight construction so as to be capable of revolving freely in response to applied weight loads, and has its peripheral surface formed with weight and value computing indicia 4. The casing is formed to include an opening 5 arranged in registration with the normal zero position of the drum 3, and this opening is provided with a lens structure 6 comprising the present invention.

The lens structure is formed to comprise a pair of glass lens sections 7 which when united produce a composite lens of plano-convex formation. A lens of this type provides for magnification of the indicia values found on the drum 3 and facilitates the reading of the drum. Between the lens structure and the drum there is provided a stationarily supported reading line in the form of a tautly held, small diameter wire. The ends of this wire are attached to arms 8 which are adjustably supported in connection with the base of the scale. Normally, this wire, which is indicated by the numeral 9, extends longitudinally of the lens structure in the plane of the meeting surfaces 10 of the lens sections 7, and in registration with the normal or zero position of the drum 3.

In ordinary scale construction the reading lens is of integral form and the observed relationship between the wire 9 and the indicia bearing surface of the drum depends upon the position of the scale reader with respect to the lens. Unless the observer looks through the center of the lens the values are apt to be misread. The present invention, therefore, provides positive means for compelling the scale reader to assume a desired or proper position when reading the scale indicator.

This result is attained, in the preferred form of the invention, by rendering the surfaces 10 of the lens sections opaque by grinding said surfaces during the process of manufacturing the lenses. I prefer to grind the surfaces 10 rather than to interpose between them an opaque strip of material, such as is disclosed in my Patent No. 1,729,106, for the reason that the ground surfaces do not reflect the light rays engaging the same as is done when an opaque strip is used. Such reflection is highly undesirable in that the scale reader may be mislead in properly understanding the drum values. With the ground surfaces, however, this difficulty is completely avoided. Moreover, the ground surfaces when viewed in true edge elevation present nothing more than a very line which does not interfere with the vision of the observer. This line is in registration with the wire 9 and in fact occupies the same plane as the latter. Therefore, the said wire 9 and the surfaces 10 produce when properly observed nothing more than a scale graduation which is of a stationary character and may be readily compared in relation to the values presented upon the movable drum 3. If, however, the scale reader should not view the surfaces 10 from a desired or proper reading position, the said surfaces will present what appears to be a strip or ribbon of some considerable thickness, depending upon the angle of the observer in looking through the lens. Therefore, due to the opaqueness of the surfaces 10 the observer is compelled to change his position to a proper one before reading the scale in order that true values may be ascertained. Most scale manufacturers use elaborate precautions in the manufacture of their products to secure a high degree of accuracy. A large part of this accuracy has been sacrificed by careless reading of the weight values presented to the observer by the scale drum or indicator. It will be observed that the present invention provides a lens structure designed for the purpose of reducing or minimizing error from this source, and provides generally for increased accuracy in the operation of computing scales.

What is claimed is:

1. In a scale, a rotatably mounted weight indicating and computing drum, a casing around said drum having a lens opening, a lens positioned in said opening and comprising a pair of adjoining sections formed to include plano and opaque meeting surfaces, said surfaces extending longitudinally of the lens in substantially the center thereof, and a stationary reading wire positioned between said lens and said drum and situated in the plane of the meeting surfaces of the lens sections.

2. In a scale, a rotatable weight indicating and computing drum, a casing around said drum provided with a lens opening, a lens structure adapted to occupy said opening and formed to include a pair of separable sections, the meeting surfaces of said sections being ground, and a reading wire arranged between said drum and said lens and stationary substantially in the plane of the ground meeting surfaces of said lens.

3. In a scale, a rotatable weight indicating and computing drum, a stationary casing arranged adjacent to said drum and provided with a lens opening, a plano-convex lens stationarily positioned in said opening, said lens consisting of a pair of duplicate sections having ground meeting surfaces, and a longitudinally extending reading element positioned between the circumference of said drum and the inner surface of said lens and arranged substantially in the plane of the ground meeting surfaces of the lens sections.

4. In a scale, a rotatable weight indicating and computing drum, a stationary casing arranged adjacent to said drum and provided with a lens opening, a lens structure adapted to occupy said opening and formed to include a pair of separable sections, at least one of the meeting surfaces of said sections being ground, and a reading wire arranged between said drum and said lens and stationary substantially in the plane of the ground meeting surfaces of said lens.

5. In a scale, a rotatable mounted weight indicating and computing drum, a casing around said opening having a lens opening, a lens positioned in said opening and comprising a pair of adjoining sections formed to include a pair of meeting surfaces, at least one of said surfaces being opaque, and a reading wire arranged between said drum and said lens and stationary substantially in the plane of the meeting surfaces of said lens.

In testimony whereof I affix my signature.

NATHAN A. HALLWOOD.